(12) United States Patent
Nemeth (10) Patent No.: US 10,693,137 B2
(45) Date of Patent: Jun. 23, 2020

(54) FUNCTIONALIZED BORON NITRIDE MATERIALS AS ELECTROACTIVE SPECIES IN ELECTROCHEMICAL ENERGY STORAGE DEVICES

(71) Applicants: Karoly Nemeth, Darien, IL (US); Boron Nitride Power, LLC, Chicago, IL (US)

(72) Inventor: Karoly Nemeth, Darien, IL (US)

(73) Assignee: Boron Nitride Power, LLC, Chicago, IL (US)

( * ) Notice: Subject to any disclaimer, the term of this patent is extended or adjusted under 35 U.S.C. 154(b) by 517 days.

(21) Appl. No.: 14/899,670

(22) PCT Filed: Jul. 3, 2014

(86) PCT No.: PCT/US2014/045402
§ 371 (c)(1),
(2) Date: Dec. 18, 2015

(87) PCT Pub. No.: WO2015/006161
PCT Pub. Date: Jan. 15, 2015

(65) Prior Publication Data
US 2016/0133928 A1     May 12, 2016

Related U.S. Application Data (60) Provisional application No. 61/982,363, filed on Apr. 22, 2014, provisional application No. 61/911,415, (Continued)

(51) Int. Cl.
*H01M 4/58* (2010.01)
*H01M 4/136* (2010.01)
(Continued)

(52) U.S. Cl.
CPC ............ *H01M 4/58* (2013.01); *H01M 4/13* (2013.01); *H01M 4/136* (2013.01);
(Continued)

(58) Field of Classification Search
CPC .......... H01M 8/10; H01M 4/88; H01M 2/145; H01M 2/1646; H01M 2/166;
(Continued)

(56) References Cited

U.S. PATENT DOCUMENTS 3,473,894 A   10/1969   Babl et al.
3,536,532 A   10/1970   Watanabe et al.
(Continued)

FOREIGN PATENT DOCUMENTS

AU    4166001    9/2001
AU    20092277158    9/2009
(Continued)

OTHER PUBLICATIONS

Arava et al. ACS Nano, 2010, 4(11), pp. 6337-6342.*
(Continued)

*Primary Examiner* — Alexander Usyatinsky
(74) *Attorney, Agent, or Firm* — Rockman Videbeck & O'Connor (57) ABSTRACT

There is provided an improved electrochemical energy storage device. The storage device includes using functionalized boron nitride nanoparticles as electroactive materials in the electrodes.

12 Claims, 2 Drawing Sheets

Related U.S. Application Data filed on Dec. 3, 2013, provisional application No. 61/905,304, filed on Nov. 18, 2013, provisional application No. 61/844,444, filed on Jul. 10, 2013.

(51) Int. Cl.

| | |
|---|---|
| *H01M 4/36* | (2006.01) |
| *H01M 4/1397* | (2010.01) |
| *H01M 4/13* | (2010.01) |
| *H01M 4/60* | (2006.01) |
| *H01M 4/80* | (2006.01) |
| *H01M 10/052* | (2010.01) |
| *H01M 10/0525* | (2010.01) |
| *H01M 4/02* | (2006.01) |

(52) U.S. Cl.
CPC ......... *H01M 4/1397* (2013.01); *H01M 4/364* (2013.01); *H01M 4/60* (2013.01); *H01M 4/80* (2013.01); *H01M 10/052* (2013.01); *H01M 10/0525* (2013.01); *H01M 2004/027* (2013.01); *H01M 2004/028* (2013.01); *H01M 2220/20* (2013.01); *H01M 2220/30* (2013.01)

(58) Field of Classification Search
CPC ...... H01M 2/1673; H01M 4/38; H01M 4/383; H01M 4/905; H01M 4/9058; H01M 8/0215; H01M 8/0226; H01M 8/065; H01M 8/1016; H01M 8/1067; C25B 9/06; C25B 1/02; C25B 11/04; C25B 13/04

See application file for complete search history.

(56) References Cited

U.S. PATENT DOCUMENTS

| | | | |
|---|---|---|---|
| 4,456,657 A | | 6/1984 | Cassat et al. |
| 4,713,284 A | | 12/1987 | Hasegawa et al. |
| 5,552,209 A | | 9/1996 | McCutcheon |
| 5,869,015 A | | 2/1999 | Vagarali |
| 7,542,560 B2 * | | 6/2009 | Creamer ........... H04M 3/42153 379/265.01 |
| 7,815,733 B2 | | 10/2010 | Iwai et al. |
| 8,206,674 B2 | | 6/2012 | Smith et al. |
| 8,258,346 B2 * | | 9/2012 | Rajendran ............. C07C 211/46 428/195.1 |
| 8,303,922 B2 | | 11/2012 | Lin et al. |
| 2011/0091789 A1 * | | 4/2011 | Mofakhami ............... C25B 1/02 429/482 |
| 2012/0021273 A1 | | 1/2012 | Ohmori et al. |
| 2012/0273733 A1 * | | 11/2012 | Sainsbury ............. B82Y 30/00 252/500 |
| 2013/0216894 A1 * | | 8/2013 | Wang ..................... H01M 4/13 429/158 |
| 2015/0299877 A1 | | 10/2015 | Mofakhami et al. |

FOREIGN PATENT DOCUMENTS

| | | | |
|---|---|---|---|
| BR | 0108561 | | 11/2002 |
| CA | 2400787 | | 8/2001 |
| CA | 2717295 | | 9/2009 |
| CN | 1444838 | | 9/2003 |
| CN | 101062766 | * | 5/2007 |
| CN | 101062766 | | 10/2007 |
| CN | 101965657 | | 2/2011 |
| CN | 101062766 | * | 5/2017 |
| EP | 1258179 | | 11/2002 |
| EP | 2253036 | | 11/2010 |
| FR | 2928492 | | 9/2009 |
| IL | 207832 | | 12/2016 |
| JP | S59169080 | | 9/1984 |
| JP | 2003524302 | | 8/2003 |
| JP | 2004079311 | | 3/2004 |
| JP | 2011517331 | | 6/2011 |
| JP | 5553778 | | 7/2014 |
| MA | 32138 | | 3/2011 |
| MX | PA02008185 | | 8/2004 |
| RU | 2010136728 | | 4/2012 |
| RU | 2478077 | * | 3/2013 |
| TW | 550987 | | 9/2003 |
| UA | 101647 C2 | | 4/2013 |
| WO | 9944960 | | 9/1999 |
| WO | 0163984 | | 8/2001 |
| WO | 2009115732 | | 9/2009 |

OTHER PUBLICATIONS

RU 2478077 MT.*
CN101062766 MT (Year: 2007).*
RU 2478077 MT (Year: 2011).*
CN101062766MT (Year: 2018).*
Tang et el Journal of Physical Chemistry C (2013), 117(10), 5067-5074. (Year: 2013).*
Paolo Giannozzi et al, "Quantum Espresso: A Modular and Open-Source Software Project for Quantum Simulations of Materials" Journal of Physics of Condensed Matter 21 (2009) 395502 (19pp).
A. Eftekhari (2004), "Potassium Secondary Cell Based on Prussian Blue Cathode," Journal of Power Sources 126, 221.
A. Bhattacharya, S. Bhattacharya, and G. P. Das, "Band Gap Engineering by Functionalization of BN Sheet," Physical Review B 85, 035415 (2012).
Yafang Xue et al, Excellent Electrical Conductivity of the Exfoliated and Fluorinated hexagonal Boron Nitride Nanosheets, Nanoscale Research Letters, 2013, 8:49.
Cheng Chung Tang et al, "Fluorination and Electrical Conductivity of BN Nanotubes," Journal American Chemical Society 2005, 127, 6552-6553.
C.Y. Zhi et al, "Chemically Activated Boron Nitride Nanotubes" Chem. Asian J. 2009, 4, 1536-1540.
Arava Leela Mohana Reddy et al., "Synthesis of Nitrogen-Doped Graphene Films for Lithium Battery Application" American Chemical Society 2010 vol. 4, No. 11, 6337-6342.
Toby Sainsbury et al, "Oxygen Radical Functionalization of Boron Nitride Nanosheets" Journal of the American Chemical Society 2012, 134, 18758-18771.
Ciping Shen et al., "Intercalation of Hexagonal Boron Nitride by Strong Oxidizers and Evidence for the Metallic Nature of the Products", Journal of Solid State Chemistry 147, 74-81 (1999).
Neil Bartlett et al., "Novel Salts of Graphite and a Boron Nitride Salt", Journal of the Chemical Society, Chemical Communications, 200-201 (1978).
T. Ikuno et al., "Amine-functionalized boron nitride nanotubes", Solid State Communications 142, 643-646 (2007).
Von Walter Rudorff et al., "Zur Konstitution des Kohlenstoffmonofluorids", Zeitschrift fur anorganische Chemie. Band 253, 281-296 (1947).

* cited by examiner

FUNCTIONALIZED BORON NITRIDE MATERIALS AS ELECTROACTIVE SPECIES IN ELECTROCHEMICAL ENERGY STORAGE DEVICES

CROSS-REFERENCE TO RELATED APPLICATIONS

This application claims the benefit of U.S. Provisional Application No. 61/844,444, filed Jul. 10, 2013, U.S. Provisional Application No. 61/905,304, filed Nov. 18, 2013, U.S. Provisional Application No. 61/911,415, filed Dec. 3, 2013, U.S. Provisional Application No. 61/982,363, filed Apr. 22, 2014, and International Application Number PCT/US2014/045402, filed Jul. 3, 2014, the contents of the foregoing provisional applications and international application being incorporated herein by reference in their entireties.

FIELD

The present invention is directed to energy storage devices and, more particularly, to such devices with functionalized boron nitride materials as electroactive species.

BACKGROUND

Energy storage devices, such as Li-ion batteries, are widely used from portable electronic devices to electric cars. In the fully charged state of the battery, Li ions are typically intercalated in the anode material, such as graphite. During discharge, Li ions migrate from the anode through the electrolytes and the separator to the positive electrode where they intercalate in the positive electrode material or cause chemical conversion in it. Simultaneously, electrons migrate from the anode through the circuit outside the battery to the positive electrode, during discharge. The driving force of the process is the difference of chemical potentials of the electroactive species in the electrodes. Batteries operate until this potential difference fails to exist. During recharging this potential difference will be restored by an external power source, using currents opposite to those mentioned for discharge. While Li-ions migrate from one electrode to the other, the oxidation number of the atoms in the electrodes also changes to maintain charge neutrality of the whole of the electrodes.

Typical intercalation materials for the positive electrode involves transition metal compound nanocrystals, such as $LiFePO_4$, $LiCoO_2$, $LiMn_2O_4$, embedded into a carbon matrix. These materials contain channels that enable Li ion mobility for intercalation and deintercalation. The electrolyte is typically a non-aqueous liquid, such as propylene carbonate, glymes, ionic liquids or polymer electrolytes. A membrane, passable for Li ions only, separates the negative and positive electrode spaces.

The performance of Li-ion batteries depends on the choice of the electrode materials and on the other components of the battery. Batteries that intercalate other than Li-ions are also known, for example Na ion batteries (S. Ohmori and T. Yamamoto, "Sodium ion battery", US 2012/0021273 A1), or K ion batteries (A. Eftekhari (2004), "Potassium secondary cell based on Prussian blue cathode," Journal of Power Sources 126, 221).

There remains a need for increased charge and discharge rates, while also allowing for similarly high or even higher gravimetric and volumetric energy densities and capacities as compared to traditional Li-ion batteries. The present invention is directed to meeting this need, including by way of using functionalized boron nitride materials as electroactive materials in the electrodes of energy storage devices, such as rechargeable batteries.

SUMMARY

There is provided an electrochemical energy storage device. The device may include a positive electrode having a first electrode potential. The positive electrode may include a positive electrode current collector, a porous, electrically and ionically conducting matrix contacting the positive electrode current collector, and covalently functionalized boron nitride nanoparticles embedded in the porous, electrically and ionically conducting matrix such that both electrons and ions are conducted to the functionalized boron nitride nanoparticles. The device also may have a negative electrode having a second electrode potential that is more negative than the first electrode potential of the positive electrode. In addition, the device may have at least one conductor ionically connecting the positive electrode to the negative electrode, wherein the conductor transports positive ions released by the negative electrode during a discharge cycle of the electrochemical energy storage device and absorbed by the negative electrode during a charge cycle.

In the electrochemical energy storage device the covalently functionalized boron nitride nanoparticles may also include covalently functionalized forms of at least one of hexagonal boron nitride, boron nitride nanotubes, cubic boron nitride, and amorphous boron nitride. The covalently functionalized boron nitride nanoparticles may comprise a surface including a carbon coating, a polymer coating, or a coating comprising porous hard materials including $Si_3N_3$ and $SiS_2$.

The covalently functionalized boron nitride nanoparticles may have an electron acceptor strength larger than that of non-functionalized boron nitride nanoparticles. The electron acceptor strength may be at least substantially equal to an amount of energy released when an electron is absorbed by one of the functionalized boron nitride nanoparticles during a discharge cycle.

The covalently functionalized boron nitride nanoparticles may be functionalized with one or more of the following: alkyl groups selected from methyl (—$CH_3$), ethyl (—$CH_2$—$CH_3$), propyl (—$(CH_2)_2$—$CH_3$), butyl (—$(CH_2)_3$—$CH_3$), isopropyl (—$CH(CH_3)_2$), isobutyl (—$CH_2$—$CH(CH_3)_2$), and tertiary butyl (—$C(CH_3)_3$); phenyl (—$C_6H_5$) and substituted phenyl; alkoxy groups selected from methoxy (—O—$CH_3$), ethoxy (—O—$CH_2$—$CH_3$), propoxy (—O—$(CH_2)_2$—$CH_3$), and butoxy (—O—$(CH_2)_3$—$CH_3$); amino (—$NH_2$) and N-functionalized amino groups; hydroxyl (—OH), oxo (—O—), peroxo (—O=O—), sulfo (—S—), disulfo (—S—S—), nitrozo (—N=O), carbonyl (—C=O), cyano (—C≡N), isocyano (—N≡C), cyanato (—O—C≡N), fulminato (—C≡N→O), isocyanato (—N=C=O), thiocyanato (—S—C≡N), thiofulminato (—C≡N→S), isothiocyanato (—N=C=S), and dicyano (—N=C=C=N—); ethynyl (—C≡C—) and diethynyl (—C≡C—C≡C—); carbodiimido (—N=C=N—) and borodiimido (—N=B—N=↔=N—B=N—); hydro (—H), nitrido (—N), and halogeno (—F, —Cl, —Br, —I); Lewis bases including nitrogen and phosphor derivatives including $NF_3$ and $PF_3$; Lewis acids including boron and aluminum derivatives including $BH_3$, $BLi_3$, $BNa_3$, $B(CH_3)_3$, $BF_3$, $AlF_3$ and $BR_1R_2R_3$, wherein each of $R_1$ $R_2$ and $R_3$ is individually selected from a halogen; transition metal complex anions including $M^{(I)}(CN)_6^{5-}$, wherein $M^{(I)}$ is Mn, $M^{(IIh)}(CN)_6^{4-}$ where $M^{(IIh)}$ is Cr, Mn, or Fe, $M^{(IIIh)}(CN)_6^{3-}$ where $M^{(IIIh)}$ is Ti, V, Cr, Mn, Fe, or Co, $M(CN)_4^{2-}$ where $M^{(II)}$ is Ni, Cu, and Zn, and $Cu(CN)_2^-$, and mixtures thereof.

The covalently functionalized boron nitride nanoparticles may be functionalized with a reaction product of Lewis base functional groups of the covalently functionalized boron nitride nanoparticles and Lewis acids including boron and aluminum derivatives including $BH_3$, $BLi_3$, $BNa_3$, $B(CH_3)_3$, $BF_3$, $AlF_3$ and $BR_1R_2R_3$ wherein each of $R_1$, $R_2$, and $R_3$ is individually selected from a halogen, wherein the reaction product may include —C≡N→$BF_3$, —C≡N→$BH_3$, or —C≡N→$BLi_3$ functional groups linked to the surface of the boron nitride nanoparticles.

The negative electrode may comprise one or more of Li, Na, K, Be, Mg, Ca, Al, their alloys and compounds with each other and with other suitable elements and materials such that the resulting material has a more negative electrode potential than the positive electrode and releases both electrons and cations of one or more of Li, Na, K, Be, Mg, Ca, Al during the discharge cycle and absorbs electrons and cations during the charge cycle.

The negative electrode may release electrons and quaternary ammonium or phosphonium cations during a discharge cycle and absorbs electrons and cations during a charge cycle.

A salt may replace the functionalized boron nitride nanoparticles. The salt may be derived from functionalized boron nitride or a material analogous to functionalized boron nitride.

The salt also may include a cation including at least one of $Li^+$, $Na^+$, $K^+$, $Mg^{2+}$, $Be^{2+}$, $Ca^{2+}$ and $Al^{3+}$, and an anion having a valence from −1 to −4 and including at least one of —N=Al—N=, —P=B—P=, —N=C=N—, =C=B—N=, —N=P—N=, =C=C=C=, and dinitridoborate anions, in a fully discharged state of the electrochemical energy storage device. The salt may be selected from the groups consisting of $Li_3BN_2$, alpha-$Li_3BN_2$, $MgLiBN_2$, $Mg_3(BN_2)_2$, $AlBN_2$, $Na_2LiBN_2$, $NaLi_2BN_2$, $Li_3AlN_2$, $Na_3AlN_2$, $Li_2NaAlN_2$, $Na_2LiAlN_2$, $LiPN_2$, $Li_2CN_2$, $Na_2CN_2$, and $MgCN_2$.

The salt may be doped with a high enthalpy of formation material. The high enthalpy of formation material may include one or more of the following: $LiNH_2$, $LiF$, $Li_2CN_2$, and $Li_2S$. The salt may comprise a surface including a carbon coating, a polymer coating, or a coating comprising porous hard materials including $Si_3N_4$ and $SiS_2$.

The positive electrode may include hexagonal boron nitride monolayers interconnected by a linking unit selected from nitrogen (N) atom, oxygen (O) atom, sulfur (S) atom, peroxo (—O—O—) group, disulfido (—S—S—) group, carbodiimido (—N=C=N—) group, or borodiimido (—N=B—N=↔=N—B=N—) group to form alternating boron nitride and link layers.

The functionalized boron nitride particles in a discharged state of the device may include being formed by a process comprising: a reaction of boron nitride particles and one of a salt solution comprising a salt and a solvent or a salt melt, wherein the solvent of the salt solution comprises a solvent that does not react with the salt in the salt solution; evaporating the solvent when the salt solution is used or solidifying the melt when the salt melt is used to form functionalized boron nitride powder; and milling the functionalized boron nitride powder to form the functionalized boron nitride nanoparticles.

The reaction of boron nitride particles and one of a salt solution or a salt melt includes activation of the reaction with sonication by ultrasound. The solvent may include supercritical ammonia.

The electrochemical energy storage may comprise functionalized doped graphene nanoparticles embedded in the porous, electrically and ionically conducting matrix of the positive electrode as a substitute for functionalized boron nitride such that both electrons and ions are conducted to the functionalized doped graphene nanoparticles, wherein doping is defined here as substituting one or more carbon atoms of the graphene lattice with at least one of B, N, Al, P Ti, V, Cr, Mn, Fe, Co, Ni, Cu, and Zn, and covalent functionalization occurs on the dopant atoms in the doped graphene lattice.

The covalently functionalized boron nitride nanoparticles may be functionalized with one or more the following: amino (—$NH_2$) and N-functionalized amino groups; hydroxyl (—OH), oxo (—O—), peroxo (—O—O—), sulfo (—S—), disulfo (—S—S—), carbonyl (—C≡O), cyano (—C≡N), isocyano (—N≡C), cyanato (—O—C≡N), fulminato (—C≡N→O), isocyanato (—N=C=O), thiocyanato (—S—C≡N), thiofulminato (—C≡N→S), isothiocyanato (—N=C=S), and dicyano (—N=C=C=N—); carbodiimido (—N=C=N—) and borodiimido (—N=B—N=↔=N—B=N—); nitrido (—N), and halogeno (—F, —Cl, —Br, —I); Lewis acids, including boron and aluminum derivatives including $BH_3$, $BLi_3$, $BNa_3$, $B(CH_3)_3$, $BF_3$, $AlF_3$ and $BR_1R_2R_3$ wherein each of $R_1$, $R_2$, and $R_3$ is individually selected from a halogen, functionalizing the previously mentioned functional groups creating further functional groups such as —C≡N→$BF_3$, —C≡N→$BH_3$, or —C≡N→$BLi_3$.

An electrochemical energy storage device may comprise a negative electrode having a first electrode potential. The negative electrode may include a negative electrode current collector, a porous, electrically and ionically conducting matrix contacting the negative electrode current collector, and covalently functionalized boron nitride nanoparticles embedded in the porous, electrically and ionically conducting matrix such that both electrons and ions are conducted to the functionalized boron nitride nanoparticles. The device may include a positive electrode having a second electrode potential that is more positive than the first electrode potential of the negative electrode. The device also may include at least one conductor ionically connecting the negative electrode to the positive electrode, wherein the conductor transports negative ions released by the positive electrode during a discharge cycle of the electrochemical energy storage device and absorbed by the positive electrode during a charge cycle.

BRIEF DESCRIPTION OF THE DRAWINGS

FIG. 2 is a schematic view of a first embodiment of an electrochemical energy storage device, showing components: 1—negative electrode current collector; 2—negative electrode that is typically made of lithium, sodium or magnesium foil or from their alloys, graphite intercalated representatives; 3—ionic conductor that allows for the passage of cations released by the negative electrode during discharge or absorbed by the negative electrode during charge, the ionic conductor is an electrical insulator, only a current of positive ions can be transported through it between the positive and negative electrodes, no current of electrons; 4—the positive electrode, an electrically and ionically conductive porous composite matrix that also contains functionalized boron nitride nanoparticles depicted by small lines and numbered as component 6; and 5—the positive electrode current collector, in accordance with implementations of this disclosure. The functionalized boron nitride nanoparticles 6 are embedded in the electrically and ionically conductive porous matrix 4 such that both electrons and ions can be conducted to or from each nanoparticle simultaneously whereby the functionalized boron nitride nanoparticles get electrochemically reduced during the discharge of the device or oxidized during the charging of the device thereby allowing for the storage of charge through the valence changes of the atoms in the functionalized boron nitride nanoparticles.

BRIEF DESCRIPTION

Figure 2:
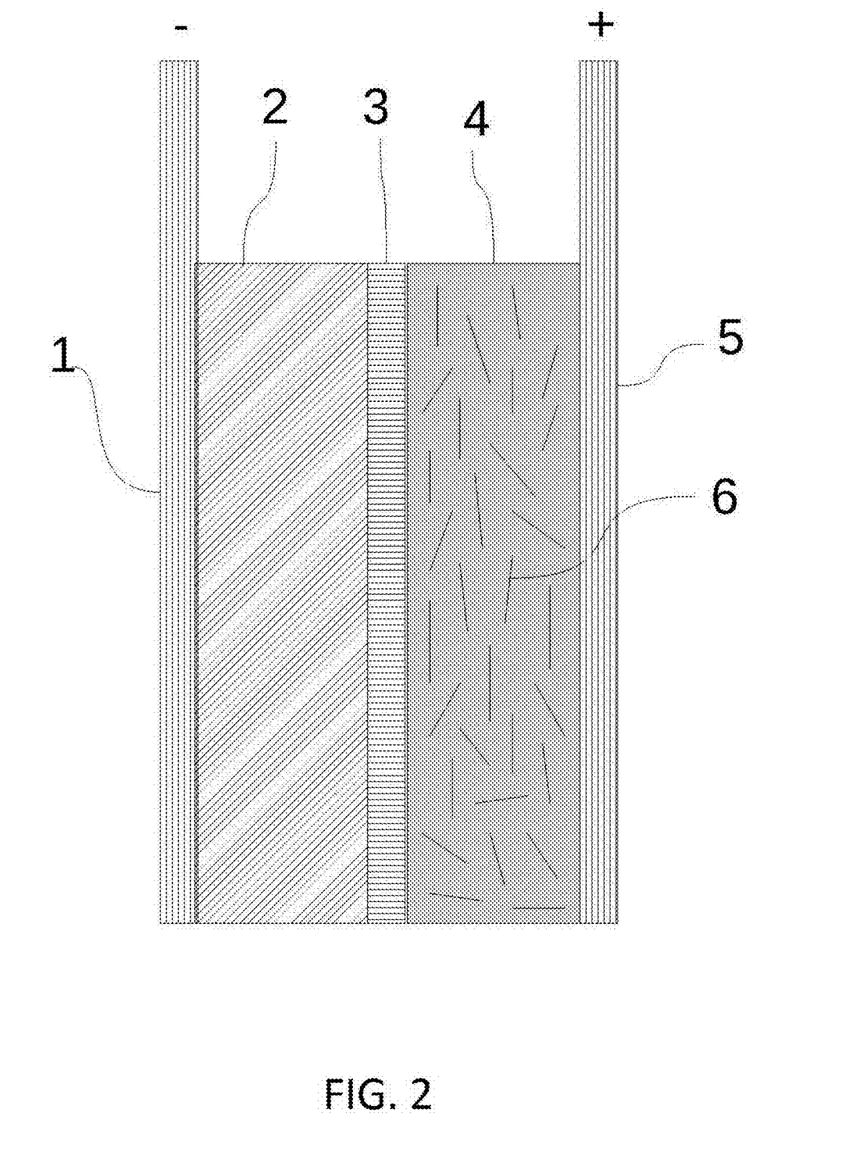

An electrochemical energy storage device comprising a positive electrode, a negative electrode and one or more ionic conductors as depicted in FIG. 2. The positive electrode comprises functionalized boron nitride nanoparticles embedded in a porous electrically and ionically conducting matrix. The negative electrode comprises a material having an electrode potential more negative than that of the positive electrode. The ionic conductors ionically connect the negative and the positive electrodes. The electrochemical energy storage device uses the functionalized boron nitride nanoparticles as electroactive species in that the functionalized boron nitride nanoparticles are electrochemically reduced to enable the release of electrical energy during the discharge of the device. During discharge, the negative electrode releases mobile cations and electrons. The electrons will be conducted to the positive electrode through the wire and load between the electrodes outside the battery, while the cations will be conducted through the ionic conductors to the positive electrode inside the battery. On charge, the flow of the electrons and mobile cations will be reversed. The battery can release electrical energy until the difference of the electrode potentials exists.

The negative electrode comprises a material having an electrode potential more negative than that of the positive electrode. Examples of negative electrode materials include bulk metallic lithium (Li), sodium (Na), potassium (K), beryllium (Be), magnesium (Mg), calcium (Ca), aluminum (Al), their alloys with each other and with other elements, and other forms of these elements, such as their intercalated forms in graphite, graphene, silicon, tin and various crystalline and amorphous materials as part of a composite electrode. The negative electrode may also be made from an electrical double layer on the surface of an electrically conductive material that releases mobile positive ions during discharge, such as quaternary ammonium and phosphonium cations.

The positive electrode comprises a composite material covering a current collector with good electrical conductivity, such as a metallic mesh. The composite material comprises nanoscopic particles of functionalized boron nitride materials as electroactive species and an electrically and ionically conducting porous matrix embedding the functionalized boron nitride nanoparticles. The composite material further comprises electrolyte and binder materials. The electrically conductive porous matrix may be based on carbon powders, such as graphene flakes, graphite powder, acetylene black and other forms of porous carbon powders. The solid, liquid or polymeric electrolyte provides a polarizable medium for the migration of ions. Examples of electrolyte materials are propylene carbonate, dimethoxyethane and aprotic ionic liquids. One example of suitable binder materials is polyvinylidene fluoride. The electrolyte and binder materials are chosen such that they essentially do not decompose under the voltages applied to the energy storage device during charging and discharging.

The production of such functionalized boron nitride materials is preferably based on the direct reaction of the exfoliated hexagonal boron nitride flakes or boron nitride nanotubes and nanoparticles with salts composed of the above and related cations and the anions of the above mentioned and related functional groups. Examples of such salts involve amides, such as $LiNH_2$, $NaNH_2$, $KNH_2$ and their N-functionalized versions; hydrides (LiH, NaH, KH); metal-organic compounds, such as $LiCH_3$, $NaCH_3$, $KCH_3$, $Mg(CH_3)_2$, $Al(CH_3)_3$, $LiC_6H_5$; $LiCH_3$, $NaOCH_3$, $KOCH_3$, $Mg(OCH_3)_2$, $Al(OCH_3)_3$, $LiOC_6H_5$; nitrides, such as $Li_3N$, $Na_3N$, $K_3N$, $Be_3N_2$, $Mg_3N_2$, $Sr_3N_2$, $Ba_3N_2$, AlN, or $Li_3BN_2$; nitrates, such as $LiNO_3$, $NaNO_3$, $KNO_3$, $Be(NO_3)_2$, $Mg(NO_3)_2$, $Ca(NO_3)_2$, $Al(NO_3)_3$; hydroxides, such as LiOH, NaOH, KOH, $Be(OH)_2$, $Mg(OH)_2$, $Ca(OH)_2$; carbonates, such as $Li_2CO_3$, $Na_2CO_3$, $K_2CO_3$, $BeCO_3$, $MgCO_3$, $CaCO_3$; fluorides, such as LiF, NaF, KF, $BeF_2$, $MgF_2$, $CaF_2$; Lewis acids and bases, such as $NF_3$, $PF_3$, $AlF_3$ and $BF_3$ and their analogues with other halogen elements and organic functional groups, such as for example $BCl_3$, $BBr_3$, $B(CH_3)_3$; cyanides, such as LiCN, NaCN, KCN, $Be(CN)_2$, $Mg(CN)_2$, $Ca(CN)_2$, $Al(CN)_3$; cianates, such as LiO—C≡N, NaO—C≡N, KO—C≡N, $Be(O—C≡N)_2$, $Mg(O—C≡N)_2$, $Ca(O—C≡N)_2$, $Al(O—C≡N)_3$; fulminates, such as LiC≡N→O, NaC≡N→O, KC≡N→O, $Be(C≡N→O)_2$, $Mg(C≡N→O)_2$, $Ca(C≡N→O)_2$, $Al(C≡N→O)_3$; isocyanates LiN═C═O, NaN═C═O, KN═C═O, $Be(N═C═O)_2$, $Mg(N═C═O)_2$, $Ca(N═C═O)_2$, $Al(N═C═O)_3$; thiocianates, such as LiS—C≡N, NaS—C≡N, KS—C≡N, $Be(S—C≡N)_2$, $Mg(S—C≡N)_2$, $Ca(S—C≡N)_2$, $Al(S—C≡N)_3$; thiofulminates, such as LiC≡N→S, NaC≡N→S, KC≡N→S, $Be(C≡N→S)_2$, $Mg(C≡N→S)_2$, $Ca(C≡N→S)_2$, $Al(C≡N→S)_3$; isothiocyanates LiN═C═S, NaN═C═S, KN═C═S, $Be(N═C═S)_2$, $Mg(N═C═S)_2$, $Ca(N═C═S)_2$, $Al(N═C═S)_3$; salts of $Li^+$, $Na^+$, $K^+$, $Be^+$, $Mg^{2+}$, $Ca^{2+}$, $Al^{3+}$ and quaternary ammonium and phosphonium cations with transition metal complex anions, such as $M^{(I)}(CN)_6^{5-}$ with $M^{(I)}$=Mn, $M^{(IIb)}(CN)_6^{4-}$ with $M^{(IIb)}$=Cr, Mn, Fe, $M^{(IIIb)}(CN)_6^{3-}$ with $M^{(IIIb)}$=Ti, V, Cr, Mn, Fe and Co, $M(CN)_4^{2-}$ with $M^{(II)}$=Ni, Cu and Zn, and $Cu(CN)_2^-$. In these reactions, the reduced form of the functionalized boron nitride materials is often produced representing the state of these materials in the discharged batteries. The charging of the battery will produce the oxidized form of the corresponding functionalized boron nitride particles in the positive electrode.

Boron nitride (BN) has several phases. Hexagonal boron nitride is produced in large quantities by the industry and is an economically available material. Its exfoliated version consisting of monolayers or a few layers is also economically available. The production of boron nitride nanotubes, cubic and amorphous boron nitride is also discussed in numerous scientific publications and patents. A few representative technologies related to the production and exfoliation of the various phases of boron nitride are the following: Albert Bable et al., "Preparation of hexagonal boron nitride", U.S. Pat. No. 3,473,894; K. Imai et al., "Method for producing hexagonal boron nitride and hexagonal boron nitride", U.S. Pat. No. 7,815,733; J. W. Connell, Y. Lin, "Method for exfoliation of hexagonal boron nitride", U.S. Pat. No. 8,303,922; S. S. Vagarali, "Method for Producing Cubic Boron Nitride Using Melamine as a Catalyst", U.S. Pat. No. 5,869,015; K. Jordan et al., "Boron Nitride Nanotubes", U.S. Pat. No. 8,206,674. These references are incorporated by reference.

Hexagonal boron nitride monolayers share the planar honeycomb structure of graphene, with boron and nitrogen atoms alternating in the vortices of the honeycomb structure.

The functionalized boron nitride material may be composed from any possible phases of boron nitride, such as hexagonal boron nitride, boron nitride nanotubes, cubic boron nitride or amorphous boron nitride. The boron nitride particles made of these boron nitride materials are preferably composed of flakes of ultrathin or monolayer hexagonal boron nitride, boron nitride nanotubes or other nanoscopic particles of the boron nitride material. Some or all of the boron and/or the nitrogen atoms on the surface of these boron nitride particles are covalently functionalized, whereby the resulting functionalized material may possess high electron attachment energy, i.e., it releases energy when it absorbs an electron. Such functionalized boron nitride materials are well suitable for application as positive electrode electroactive species. In certain cases, the functionalization of boron nitride may also lead to an increased electron donor character with a reduced electron attachment energy as compared to non-functionalized boron nitride. In such a case, the functionalized boron nitride material may preferentially be used as a negative electrode electroactive species. Any phases of such functionalized boron nitride materials obtained by varying the pressure, temperature or by any other synthesis routes are also understood here as functionalized boron nitride materials. For example the compound with the stoichiometry of $Li_3BN_2$ obtainable from boron nitride as dissolved and functionalized in molten $Li_3N$ and, then, annealed is also understood here as functionalized boron nitride.

Materials analogous to $Li_3BN_2$ with a stoichiometry xA3N.y(MN) or $xAe3N_2$.y(MN) are also considered functionalized boron nitride, for the same reason as $Li_3BN_2$, x and y are positive nonzero real numbers defining the ratio of components $A_3N$, (MN) and $Ae3N_2$, where A represents alkali metals (A=Li, Na, K), Ae represents alkaline earth metals (Ae=Be, Mg, Ca) and MN represents boron nitride or aluminum nitride. In the A3N.y(MN) or $xAe3N_2$.y(MN) compounds the individual components chemically mix with each other and form new compounds or composite materials. An important example of this class of materials is $Li_3AlN_2$ and $Na_3AlN_2$. These materials can often be synthesized by melting together the individual nitride components and annealing the melt.

For positive electrode application, the guiding principle for the choice of functionalization should be that the functionalization of the boron nitride particles increases the electron affinity of the particles, i.e., it strengthens their electron accepting ability. In yet other words, the functionalization leads to increased electron attachment energy, meaning that increased amount of energy is released when electrons attach to such functionalized particles, as compared to non-functionalized boron nitride. Functional groups with electron withdrawing character can induce large positive partial charges in the boron and nitrogen centers of boron nitride, making the functionalized system a strong electron acceptor and a good positive electrode electroactive species, and this will lead to high voltage and high energy density batteries. The following functional groups, primarily functionalizing the boron centers, are especially well suited for this purpose: —F, —C≡N, —N≡C, —O—C≡N, —N═C—O, —S—C≡N, —N═C═S, —N═C═C═N—, —N═C═N—, —N═B—N═↔═N—B═N—, —O, —N; $NF_3$, $PF_3$, oxidized forms of $Fe(CN)_6^{4-}$, $Mn(CN)_6^{4-}$ and other transition metal complexes, also derivatives of the phenyl group containing electron withdrawing functional groups, such as for example cyano (—C≡N) functionalized benzene derivatives. Examples of functional groups that primarily functionalize the N centers and lead to increased electron attachment energy are Lewis acids, such as $BF_3$, $BCl_3$ and $B(CH_3)_3$.

The reactions of the salts mentioned above with boron nitride to produce functionalized boron nitrides may be carried out in the melts/liquid phases of the salts or in suitable solvents, such as aqueous solutions or aprotic organic solvents, the latter including ionic liquids and other polar organic solvents. The anions of the salts are initially either physisorbed or chemisorbed primarily to the boron centers of the surface. After the charging of the battery the anions become oxidized and covalently bound to the surface of the boron nitride particle.

Figure 1:
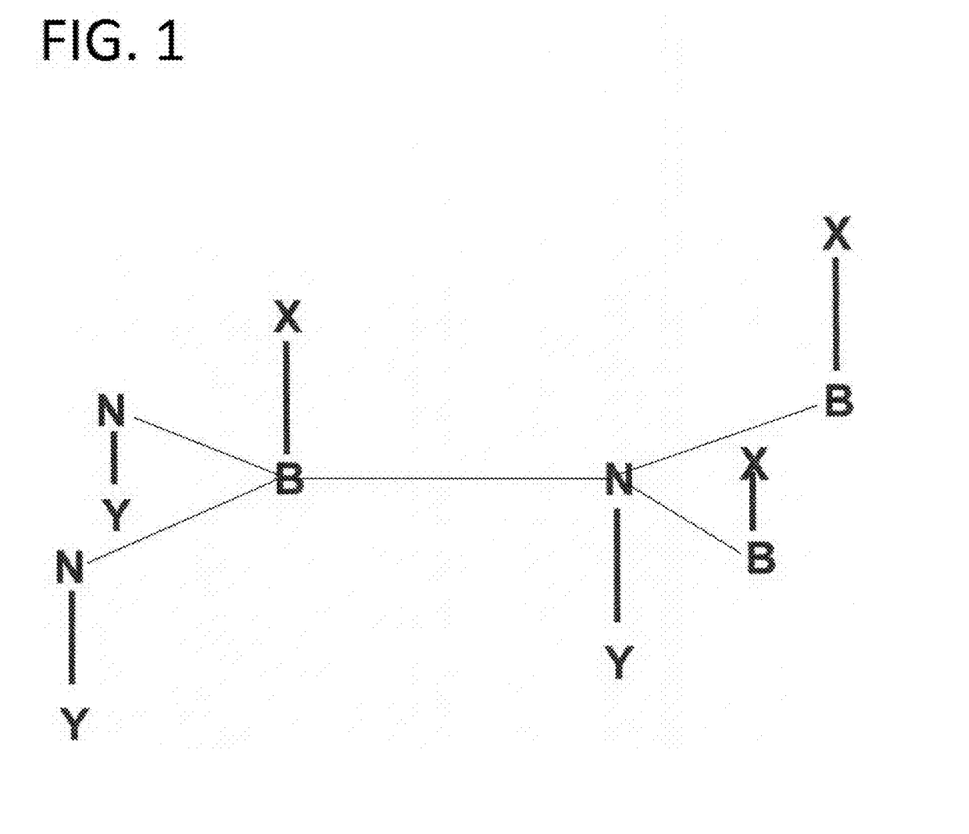
FIG. 1 is a schematic view of a fragment of one example of functionalized hexagonal boron nitride, where the boron and nitrogen atoms are approximately coplanar, while the X and Y functional groups are covalently bound to the boron and nitrogen centers, respectively, above and below the plane of these centers (lines between atoms represent covalent bonds).

Examples of covalent functionalization of the boron and nitrogen centers of the boron nitride nanoparticles include alkyl groups, such as methyl (—$CH_3$), ethyl (—$CH_2$—$CH_3$), propyl (—$(CH_2)_2$—$CH_3$), butyl (—$(CH_2)_3$—$CH_3$), isopropyl (—$CH(CH_3)_2$), isobutyl (—$CH_2$—$CH(CH_3)_2$), tertiary butyl (—$C(CH_3)_3$); phenyl (—$C_6H_5$) and substituted phenyl, alkoxy groups, such as methoxy (—O—$CH_3$), ethoxy (—O—$CH_2$—$CH_3$), propoxy (—O—$(CH_2)_2$—$CH_3$), butoxy (—O—$(CH_2)_3$—$CH_3$); amino (—$NH_2$) and N-functionalized amino groups; hydroxyl (—OH), oxo (═O), peroxo (—O—O—), sulfo (═S), disulfo (—S—S—), nitrozo (—N═O), carbonyl (—C═O), cyano (—C≡N), isocyano (—N≡C), cyanato (—O—C≡N), fulminato (—C≡N→O), isocyanato (—N═C═O), thiocyanato (—S—C≡N), thiofulminato (—C≡N→S), isothiocyanato (—N═C═S), dicyano (—N═C═C═N—), ethynyl (—C≡C—), diethynyl (—C≡C—C≡C—), carbodiimido (—N═C═N—), borodiimido (—N═B—N═↔═N—B═N—), hydro (—H) groups; nitrido (—N); halogeno (—F, —Cl, —Br, —I); boron, aluminum, nitrogen and phosphor derivatives acting as Lewis bases (functionalizing the boron centers, such as $NF_3$ or $PF_3$), or Lewis acids (functionalizing the nitrogen centers, such as $BF_3$ or $AlF_3$); functional groups derived from transition metal complex anions, such as from the oxidized forms of ferrocyanide ($Fe(CN)_6^{4-}$) and ferricyanide ($Fe(CN)_6^{3-}$) ions and analogues. A mixture of functionalization or functional groups binding to multiple sites on the same boron nitride surface at the same time, such as for example N(—$CH_2$—CH—)$_3$, are also allowed. Also note that the smallest functionalized boron nitride particles include borazine ($N_3B_3H_6$) and ammonia borane ($NBH_6$) and their functionalized and H-substituted versions. One possible functionalization of hexagonal boron nitride is shown in FIG. 1.

Both the boron and nitrogen centers of boron nitride may be functionalized to increase the energy density and the capacity of the battery. For example, halogen elements (F, Cl, Br, I) can be used for the functionalization of both centers. Lewis acids, such as $BF_3$, $BCl_3$, $BBr_3$, $B(CH_3)_3$, $AlF_3$, $AlCl_3$, $AlBr_3$, $Al(CH_3)_3$, will functionalize the N centers of boron nitride nanoparticles, while Lewis bases, such as $NF_3$, $PF_3$ and their other halogenated versions functionalize the B centers. Anions of salts will primarily functionalize the boron centers.

Theoretical studies on the functionalization of boron nitride particles indicate strong covalent binding between the boron atoms and the functional groups. Chemisorption binding energies are typically in the 1.5-6.0 eV range as described in "Band gap engineering by functionalization of BN sheet", by A. Bhattacharya, S. Bhattacharya and G. P. Das, in Physical Review B 85, 035415 (2012), hereby fully incorporated by reference. Functionalization of boron nitride with organic peroxides and hydroxyl group as described in "Chemically Activated Boron Nitride Nanotubes", by C. Y. Zhi et al., Chemistry an An Asian Journal, 4, 1536, (2009) and in "Oxygen Radical Functionalization of Boron Nitride Nanosheets" by Toby Sainsbury et al., Journal of The American Chemical Society, 134, 18758, (2012) and functionalization with fluorine as described in "Fluorination and Electrical Conductivity of BN Nanotubes" by C. Tang et al., Journal of the American Chemical Society, Communications, 127, 6552 (2005) and in "Excellent electrical conductivity of the exfoliated and fluorinated hexagonal boron nitride nanosheets" by Y. Xue et al., Nanoscale Research Letters 8, 49 (2013) have also been carried out experimentally. These publications are hereby fully incorporated by reference. These references, however, lack teaching the use of these materials for electrochemical energy storage devices.

The boron atoms in the hexagonal boron nitride flakes can be functionalized from either one or the other side of the planar structure. Boron nitride particles may also get interconnected when functionalized with groups that can bind to more than one boron atoms. Some functionalizations may result in the substitution of B or N atoms of the boron nitride particles. Such functionalizations may still be useful for applications as electroactive materials as they may still serve the purpose of allowing for high electron attachment energies of the boron nitride particles.

The principles described above can also be applied to graphene materials that are doped with boron, nitrogen, aluminum, phosphorus or other main group III or IV atoms and, thus, allow for similar functionalization. The doping means substitution of a fraction of atoms in graphene or boron nitride by atoms other than C for graphene and other than B or N for boron nitride. Even though such materials have already been synthesized, nothing is known of their functionalized forms yet. A review of such materials can be found in "Synthesis Of Nitrogen-Doped Graphene Films For Lithium Battery Application", by A. L. M. Reddy et al., ACS Nano, 4, 6337 (2010), which is hereby fully incorporated by reference. Furthermore, doping graphene or boron nitride with transition metal elements, such as Ti, V, Cr, Mn, Fe, Co, Ni, Cu and Zn, also leads to increased ability for functionalization, and thus, the functionalized forms of these materials can also be used as electroactive species in positive electrodes of electrochemical energy storage devices.

Charge and discharge rates are significantly higher in many of these functionalized boron nitride materials than for typical three-dimensional Li-ion intercalation materials, since the Li ions (or other cations) have to intercalate into functionalized two-dimensional surfaces only, instead of intercalating inside nanoscopic crystals. Gravimetric and volumetric energy densities, as well as capacities of the boron nitride based devices, are similar to those of Li ion batteries when the surfaces of the boron nitride nanoparticles are functionalized densely and with functional groups that promote high voltage (high electron attachment energy) and high capacity.

Examples of functionalized boron nitride particles and their calculated properties are provided below. More specifically, the reduced (discharged) and oxidized (charged) forms of positive electrode materials are presented here along with their electronic energies as calculated using the Quantum Espresso (version 5.0.2, svn revision 9656) suit of electronic structure codes. The voltage of the corresponding batteries is also calculated and presented here as the electronic energy change during the cell reaction, as expressed in units of electron volts divided by the number of electrons transferred during the reaction. The Quantum Espresso suite of programs is described in P. Giannozzi, et. al (2009), "QUANTUM ESPRESSO: a modular and open-source software project for quantum simulations of materials", Journal of Physics: Condensed Matter, 39, 395502; www.quantum-espresso.org. A wavefunction cut-off of 50-80 rydbergs has been applied, in combination with PBEsol exchange-correlation functionals implemented with ultrasoft pseudopotentials as provided with Quantum Espresso. The density of the k-space gridpoints was gradually increased until structures and energies converged, typically a k-space grid density of 2×2×2 (for 3D crystals) or a 2×2×1 (for monolayer slabs) is sufficient for electrochemical accuracy, but convergence of structural relaxations and energies were checked beyond this k-space density as well. Residual forces on converged atomic positions were smaller than 0.0001 Rydberg/bohr, residual pressure on the converged simulation cell was smaller than 1 kbar, electronic energies were converged to 0.01 microRydbergs. The electronic energies obtained for the relaxed structures were used as approximate enthalpies to calculate reaction enthalpies of the electrochemical cell reactions and the corresponding voltages and energy densities. These calculations are meant to be a guidance to obtain good estimates of the stability and structure, as well as the energetics and voltage of the electroactive species in the cell reactions. The voltages are in reference to the corresponding bulk metal electrodes.

Example 1: α-$Li_3BN_2$

Cell reaction for discharge: $4Li+2LiBN_2 \rightarrow 2Li_3BN_2$
Electronic energies: $E(2Li_3BN_2)=-182.229491$ Ry; $E(2LiBN_2)=-122.243727$ Ry; $E(2\times 2Li)=-58.92329074$ Ry.
Cell reaction energy:
$\Delta E=E(2Li_3BN_2)-E(2LiBN_2)-E(2\times 2Li)=-1.062387$ Ry=−14.453782 eV.
Cell voltage: $U=-\Delta E/4$ electrons=3.613 V.
Mass-density: $\rho_M(Li_3BN_2)=1.823$ kg/L.
Gravimetric energy density: $\rho_{EG}(Li_3BN_2)=-\Delta E/(6M(Li)+2M(B)+4M(N))=3247$ Wh/kg.
Volumetric energy density: $\rho_{EV}(Li_3BN_2)=5919$ Wh/L.
Gravimetric capacity density: $\rho_{CG}(Li_3BN_2)=899$ mAh/g.
Volumetric capacity density: $\rho_{CV}(Li_3BN_2)=1638$ mAh/$cm^3$.

Example 2: BNCNNa

In this example, the hexagonal boron nitride monolayer is functionalized by cyano groups on the boron atoms, on both sides of the monolayer, with a single cyano group attached to each boron atom. An approximately 30 Å wide vacuum layer separates the functionalized monolayers, while 3D periodic boundary conditions are applied.
Cell reaction for discharge: $2Na+2BNCN \rightarrow 2BNCNNa$
Electronic energies: $E(2BNCNNa)=-301.33420522$ Ry; $E(2BNCN)=-116.69635186$ Ry; $E(2Na)=-184.21607496$ Ry.

Cell reaction energy:
$\Delta E = E(2BNCNNa) - E(2BNCN) - E(2Na) = -0.42177839$ Ry $= -5.73829505$ eV.

Cell voltage: $U = -\Delta E/2$ electrons $= 2.87$ V.

Mass-density: $\rho_M(BNCNNa) \approx 3.406$ kg/L.

Gravimetric energy density: $\rho_{EG}(BNCNNa) = -\Delta E/(2M(Na) + 2M(B) + 4M(N) + 2M(C)) = 1042$ Wh/kg.

Volumetric energy density: $\rho_{EV}(BNCNNa) = 3547$ Wh/L.

Gravimetric capacity density: $\rho_{CG}(BNCNNa) = 363$ mAh/g.

Volumetric capacity density: $\rho_{CV}(BNCNNa) = 1236$ mAh/cm$^3$.

Example 3: BNNBNLi$_3$

In this example, the hexagonal boron nitride monolayer is functionalized by borodiimido groups on the boron atoms, on both sides of the monolayer, with a single borodiimido group attached to each boron atom of the hexagonal boron nitride monolayer. An approximately 30 Å wide vacuum layer separates the functionalized monolayers, while 3D periodic boundary conditions are applied.

Cell reaction for discharge: 6Li+2BNNBN→2BNNBNLi$_3$

Electronic energies: $E(2BNNBNLi_3) = -235.1329642302$ Ry; $E(2BNNBN) = -145.91847540$ Ry; $E(2Li) = -29.46164537$ Ry.

Cell reaction energy:
$\Delta E = E(2BNNBNLi_3) - E(2BNNBN) - 3E(2Li) = -0.82955272$ Ry $= -11.28606475$ eV.

Cell voltage: $U = -\Delta E/6$ electrons $= 1.88$ V.

Mass-density: $\rho_M(BNNBNLi_3) \approx 2.263$ kg/L.

Gravimetric energy density: $\rho_{EG}(BNNBNLi_3) = -\Delta E/(6M(Li) + 4M(B) + 6M(N)) = 1790$ Wh/kg.

Volumetric energy density: $\rho_{EV}(BNNBNLi_3) = 4050$ Wh/L.

Gravimetric capacity density: $\rho_{CG}(BNNBNLi_3) = 952$ mAh/g.

Volumetric capacity density: $\rho_{CV}(BNNBNLi_3) = 2154$ mAh/cm$^3$.

Example 4: BNNCNLi$_2$

In this example, the hexagonal boron nitride monolayer is functionalized by carbodiimido groups on the boron atoms, on both sides of the monolayer, with a single carbodiimido group attached to each boron atom of the hexagonal boron nitride monolayer. An approximately 30 Å wide vacuum layer separates the functionalized monolayers, while 3D periodic boundary conditions are applied.

Cell reaction for discharge: 4Li+2BNNCN→2BNNCNLi$_2$

Electronic energies: $E(2BNNCNLi_2) = -216.6704818572$ Ry; $E(2BNNCN) = -157.05154280$ Ry; $E(2Li) = -29.46164537$ Ry.

Cell reaction energy:
$\Delta E = E(2BNNCNLi_2) - E(2BNNCN) - 2E(2Li) = -0.69564831$ Ry $= -9.46429535$ eV.

Cell voltage: $U = -\Delta E/4$ electrons $= 2.366$ V.

Mass-density: $\rho_M(BNNCNLi_2) \approx 2.949$ kg/L.

Gravimetric energy density: $\rho_{EG}(BNNCNLi_2) = -\Delta E/(4M(Li) + 2M(B) + 6M(N) + 2M(C)) = 1611$ Wh/kg.

Volumetric energy density: $\rho_{EV}(BNNCNLi_2) = 4751$ Wh/L.

Gravimetric capacity density: $\rho_{CG}(BNNCNLi_2) = 680$ mAh/g.

Volumetric capacity density: $\rho_{CV}(BNNCNLi_2) = 2008$ mAh/cm$^3$.

Example 5: AlN(BN)$_2$

In this example, hexagonal boron nitride monolayers are linked through N atoms and form a multilayer sandwich structure with channels for intercalating cations, such as Al$^{3+}$.

Cell reaction for discharge: Al+N(BN)$_2$→AlN(BN)$_2$

Electronic energies: $E(2AlN(BN)_2) = -157.81487893$ Ry; $E(2N(BN)_2) = -146.22361240$ Ry; $E(2Al) = -10.90558327$ Ry.

Cell reaction energy:
$\Delta E = E(AlN(BN)_2) - E(N(BN)_2) - E(2Al) = -0.68568326$ Ry $= -9.3287207523$ eV.

Cell voltage: $U = -\Delta E/6$ electrons $= 1.555$ V.

Mass-density: $\rho_M(AlN(BN)_2) \approx 3.470$ kg/L.

Gravimetric energy density: $\rho_{EG}(AlN(BN)_2) = -\Delta E/(2M(Al) + 4M(B) + 6M(N)) = 1379$ Wh/kg.

Volumetric energy density: $\rho_{EV}(AlN(BN)_2) = 4787$ Wh/L.

Gravimetric capacity density: $\rho_{CG}(AlN(BN)_2) = 887$ mAh/g.

Volumetric capacity density: $\rho_{CV}(AlN(BN)_2) = 3079$ mAh/cm$^3$.

Example 6: BNNBNAl

In this example, the hexagonal boron nitride monolayer is functionalized by borodiimido groups on the boron atoms, on both sides of the monolayer, with a single borodiimido group attached to each boron atom of the hexagonal boron nitride monolayer. An approximately 30 Å wide vacuum layer separates the functionalized monolayers, while 3D periodic boundary conditions are applied. Al$^{3+}$ cations are the mobile cations.

Cell reaction for discharge: 2Al+2BNNBN→2BNNBNAl

Electronic energies: $E(2BNNBNAl) = -157.58583252$ Ry; $E(2BNNBN) = -145.91847540$ Ry; $E(2Al) = -10.90558327$ Ry.

Cell reaction energy:
$\Delta E = E(2BNNBNAl) - E(2BNNBN) - E(2Al) = -0.76177385$ Ry $= -10.36393327$ eV.

Cell voltage: $U = -\Delta E/6$ electrons $= 1.72$ V.

Mass-density: $\rho_M(BNNBNAl) \approx 4.000$ kg/L.

Gravimetric energy density: $\rho_{EG}(BNNBNAl) = -\Delta E/(6M(Li) + 4M(B) + 6M(N)) = 1532$ Wh/kg.

Volumetric energy density: $\rho_{EV}(BNNBNAl) = 6130$ Wh/L.

Gravimetric capacity density: $\rho_{CG}(BNNBNAl) = 887$ mAh/g.

Volumetric capacity density: $\rho_{CV}(BNNBNAl) = 3549$ mAh/cm$^3$.

The one or more ionic conductors comprise materials allowing for the transport of ions between the positive and the negative electrodes. In one embodiment, the ionic conductor comprises an electrolytic fluid for the positive electrode space and another electrolytic fluid for the negative electrode space separated from each other by an ion selective membrane. The ion selective membrane allows the transport of the cations released by the negative electrode during discharge or absorbed by the negative electrode on charge. The electrolytic fluids are essentially non-reactive to the other battery components, though they may contribute to the formation of electrode-electrolyte interfaces. The electrolytic fluids provide an electrically polarizable medium, usually through molecules with large dipole moments that mediates electrostatic interactions within the battery and promotes the equilibration of positive and negative charges. Such electrolytic fluids may be protic or aprotic depending on the choice of the electroactive species and the rest of the battery. For the negative electrode, space aprotric electrolytes are preferred. Examples of suitable aprotic electrolytic fluids include propylene carbonate, dimethoxyethane and aprotic ionic liquids and their mixtures and dissolved salts that increase the ionic conductivity of the medium but do not participate in electrode reactions. An example of such salts is lithium bis oxalato borate (LiBOB). Similar electrolytic fluids are preferentially applicable to the positive electrode space as well. In another preferred embodiment, the ionic conductors may be based on polymeric macromolecules that provide a similar ionic conductivity as the electrolytic fluids. An example of such polymer is polyvinilidene fluoride. The ion selective membranes in the ionic conductors may be based on polymers, such as the NAFION type membranes, or they may be ceramic materials such as LISICON.

One mode of operation of the electrochemical energy storage devices based on functionalized boron nitride positive electrode electroactive species uses two- or three-atomic functional groups attached to each boron atoms of the boron nitride monolayer or boron nitride nanotube, while the nitrogen atoms of the boron nitride monolayers and nanotubes remain non-functionalized. Each functionalized boron atom of the boron nitride monolayers or nanotubes is functionalized only by a single functional group. The functional groups that are spatial neighbors on the functionalized surfaces may further become interconnected through shared atoms and bonds. Such interconnection may happen after functionalization of the boron nitride surfaces as a consequence of additional reactions between neighboring functional groups. For positive electrode electroactive species, the preferred functional groups functionalizing the boron nitride monolayers and nanotubes are the cyano (—C≡N), isocyano (—N≡C), cyanato (—O—C≡N), fulminato (—C≡N→O), isocyanato (—N=C=O), thiocyanato (—S—C≡N), thiofulminato (—C≡N→S), isothiocyanato (—N=C=S), dicyano (—N=C=C=N—), carbodiimido (—N=C=N—), borodiimido (—N=B—N=↔=N—B=N—) groups, as well as their $BF_3$, $AlF_3$ and sulfur (—S—) or oligosulfur (—$S_n$—) adducts. An example of such an adduct forms when $BF_3$ or sulfur is chemisorbed to the cyano groups of the cyano-functionalized boron nitride monolayers (—C≡N→$BF_3$ and —C≡N→S). Other preferred embodiments of the positive electrode electroactive species include 3D structures of sulfur (—S—), oligosulfur (—$S_n$—), oxygen (—O—) or nitrogen (—N—) interconnected boron nitride monolayers. In another preferred embodiment, the electroactive species of the positive electrode are α-$Li_3BN_2$, $Li_3AlN_2$ or $LiPN_2$, which may preferably be doped with $Li_2S$, LiF, $Li_2CN_2$, $LiNH_2$ in a 5-50 mol % amount to increase ionic conductivity and electrochemical stability. Preferred anode materials are bulk lithium, sodium, magnesium and aluminum or their suitable composites and alloys that allow for safe operation of the storage device, such as for example graphite intercalated lithium. Preferred electrolytes are based on glymes, propylene carbonate, ethylene carbonate, dioxolane, sulfolane, dimethylformamide, dimethylacetamide, organic ionic liquids, methyl ethyl carbonate, γ-butyrolactone, tetrahydrofuran, N-methyl-2-pyrrolidone with added dissolved salts of the anode electroactive metal, such as salts with $PF_6^-$, $ClO_4^-$, $BF_4^-$, $CF_3SO_3^-$, $N(CF_3SO_2)_2^-$, $N(C_2F_5SO_2)_2^-$, $C(CF_3SO_2)_3^-$, $C(C_2F_5SO_2)_3^-$ and halogen anions for increased ionic conductivity. In some preferred embodiments, there is no liquid electrolyte as the functionalized boron nitride particles have sufficient ionic conductivity to serve as electroactive species and electrolyte in the same time. Binder materials are preferably based on polyvinylidene-fluoride, acrylonitrile polymers, such as a copolymer of acrylonitrile and methyl methacrylate and a copolymer of acrylonitrile and methyl acrylate; and poly ethylene oxide. Such binder materials may also serve as solid polymer electrolytes eliminating the use of liquid electrolytes. Both electrolytes and binder materials have to be chosen such that they do not react with the electroactive species, or the electroactive species should be protected by surface coating by porous carbon, polymers or porous inorganic materials such as $Si_3N_4$ or $SiS_2$, to avoid such unintended reactions. Preferred cation-selective membranes separating the anode and cathode spaces may be based on NAFION type membranes, or ceramic membranes, such as LISICON ones.

It is to be understood that various changes in the details, materials, arrangements of parts and components and methods which have been described and illustrated herein in order to explain the nature of the energy storage devices that may be made by those skilled in the art within the principle and scope of the energy storage devices as expressed in the appended claims. Furthermore, while various features have been described with regard to particular embodiments and methods, it will be appreciated that features described for one embodiment also may be incorporated with the other described embodiments.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, 6. In particular, the use of "step of" in the claims herein is not intended to invoke the provisions of 35 U.S.C. § 112, 6.

What is claimed is:

1. An electrochemical energy storage device comprising:
   a positive electrode including a first electrode potential, the positive electrode comprising:
   a positive electrode current collector;
   a porous, electrically and ionically conducting matrix contacting the positive electrode current collector; and
   covalently functionalized boron nitride nanoparticles embedded in the porous, electrically and ionically conducting matrix, both electrons and ions are conducted to the functionalized boron nitride nanoparticles;
   a negative electrode including a second electrode potential that is more negative than the first electrode potential of the positive electrode;
   at least one conductor ionically connecting the positive electrode to the negative electrode, the conductor transporting positive ions released by the negative electrode during a discharge cycle of the electrochemical energy storage device and absorbed by the negative electrode during a charge cycle,
   the covalently functionalized boron nitride nanoparticles being functionalized with a reaction product of Lewis base functional groups of the covalently functionalized boron nitride nanoparticles and Lewis acids.

2. The electrochemical energy storage device of claim 1, wherein the aprotic negative electrode consists of at least one material selected from the group consisting of Li, Na, K, Be, Mg, Ca, and Al, the resulting negative electrode having a more negative electrode potential than the positive electrode and releases both electrons and cations consisting of at least one of Li, Na, K, Be, Mg, Ca, and Al released during the discharge cycle and absorbs electrons and cations during the charge cycle.

3. The electrochemical energy storage device of claim 1, wherein the aprotic negative electrode releases electrons and at least one of quaternary ammonium and phosphonium cations during a discharge cycle and absorbs electrons and cations during a charge cycle.

4. An electrochemical energy storage device comprising:
a positive electrode including a first electrode potential, the positive electrode comprising:
   a positive electrode current collector;
   a porous, electrically and ionically conducting matrix contacting the positive electrode current collector; and
   covalently functionalized boron nitride nanoparticles embedded in the porous, electrically and ionically conducting matrix, both electrons and ions are conducted to the functionalized boron nitride nanoparticles;
a negative electrode including a second electrode potential that is more negative than the first electrode potential of the positive electrode;
at least one conductor ionically connecting the positive electrode to the negative electrode, wherein the conductor transports positive ions released by the negative electrode during a discharge cycle of the electrochemical energy storage device and absorbed by the negative electrode during a charge cycle; and
wherein the positive electrode comprises hexagonal boron nitride monolayers interconnected by a linking unit selected from the group consisting of nitrogen (N) atom, oxygen (O) atom, sulfur (S) atom, peroxo (—O—O—) group, disulfido (—S—S—) group, carbodiimido (—N=C=N—) group, and borodiimido (—N=B—N—↔=N—B=N—) group to form alternating boron nitride and link layers.

5. An electrochemical energy storage device comprising:
a positive electrode including a first electrode potential, the positive electrode comprising:
a positive electrode current collector;
a porous, electrically and ionically conducting matrix contacting the positive electrode current collector; and
covalently functionalized boron nitride nanoparticles embedded in the porous, electrically and ionically conducting matrix, both electrons and ions are conducted to the functionalized boron nitride nanoparticles;
a negative electrode including a second electrode potential that is more negative than the first electrode potential of the positive electrode;
at least one conductor ionically connecting the positive electrode to the negative electrode, the conductor transporting positive ions released by the negative electrode during a discharge cycle of the electrochemical energy storage device and absorbed by the negative electrode during a charge cycle,
the covalently functionalized boron nitride nanoparticles being functionalized with oxo groups (—O—);
   the further functionalization of oxo functionalized boron nitride occurring with Lewis acids $BR_1R_2R_3$, Al $R_1R_2R_3$, $SO_2$ and $SO_3$, and resulting in —$OBR_1R_2R_3$, —$OAlR_1R_2R_3$, —$OSO_2$ and —$OSO_3$ functional groups, respectively, where $R_1$, $R_2$ and $R_3$ are each halogens selected from the group consisting of F, Cl, Br, and I.

6. An electrochemical energy storage device comprising:
a positive electrode including a first electrode potential, the positive electrode comprising:
a positive electrode current collector;
a porous, electrically and ionically conducting matrix contacting the positive electrode current collector; and
covalently functionalized boron nitride nanoparticles embedded in the porous, electrically and ionically conducting matrix, both electrons and ions are conducted to the functionalized boron nitride nanoparticles;
a negative electrode including a second electrode potential that is more negative than the first electrode potential of the positive electrode;
at least one conductor ionically connecting the positive electrode to the negative electrode, the conductor transporting positive ions released by the negative electrode during a discharge cycle of the electrochemical energy storage device and absorbed by the negative electrode during a charge cycle,
wherein the covalently functionalized boron nitride nanoparticles comprise being functionalized with a reaction product of Lewis base functional groups of the covalently functionalized boron nitride nanoparticles and Lewis acids, the Lewis acids including at least one of boron derivatives and aluminum derivatives including $BH_3$, $BLi_3$, $BNa_3$, $B(CH_3)_3$, $BR_1R_2R_3$, and $AlR_1R_2R_3$ wherein each of $R_1$, $R_2$, and $R_3$ comprises a halogen selected from the group consisting of F, Cl, Br and I, wherein the reaction product is selected from the group consisting of —C≡N→$BF_3$, —C≡N→$BH_3$, —C≡N→$BLi_3$ and —C≡N→($BLi_3$/$BNa_3$/$B(CH_3)_3$/$BR_1R_2R_3$/$AlLi_3$/$AlNa_3$/$Al(CH_3)_3$/$AlR_1R_2R_3$) functional groups linked to the surface of the boron nitride nanoparticles.

7. An electrochemical energy storage device comprising:
a positive electrode including a first electrode potential, the positive electrode comprising:
a positive electrode current collector;
a porous, electrically and ionically conducting matrix contacting the positive electrode current collector; and
covalently functionalized boron nitride nanoparticles embedded in the porous, electrically and ionically conducting matrix, both electrons and ions are conducted to the functionalized boron nitride nanoparticles;
a negative electrode including a second electrode potential that is more negative than the first electrode potential of the positive electrode;
at least one conductor ionically connecting the positive electrode to the negative electrode, the conductor transporting positive ions released by the negative electrode during a discharge cycle of the electrochemical energy storage device and absorbed by the negative electrode during a charge cycle,
the covalently functionalized boron nitride nanoparticles being functionalized with oxo groups (—O—); and
Lewis acids including at least one of boron derivatives and aluminum derivatives including at least one of $BH_3$, $BLi_3$, $BNa_3$, $B(CH_3)_3$, and $BR_1R_2R_3$ and Al $R_1$ $R_2$ $R_3$, wherein each of $R_1$, $R_2$, and $R_3$ comprises a halogen selected from the group consisting of F, Cl, Br, and I, functionalizing the previously mentioned functional groups creating further functional groups;

the further functionalization of oxo functionalized boron nitride occurring with Lewis acids $BR_1R_2R_3$, $AlRR_1R_2R_3$, $SO_2$ and $SO_3$, and resulting in —$OBR_1R_2R_3$, —$OAlR_1R_2R_3$, —$OSO_2$ and —$OSO_3$ functional groups, respectively, where $R_1$, $R_2$ and $R_3$ are each halogens selected from the group consisting of F, Cl, Br, and I.

8. An electrochemical energy storage device comprising:
a positive electrode including a first electrode potential, the positive electrode comprising:
a positive electrode current collector;
a porous, electrically and ionically conducting matrix contacting the positive electrode current collector; and
covalently functionalized boron nitride nanoparticles embedded in the porous, electrically and ionically conducting matrix, both electrons and ions are conducted to the functionalized boron nitride nanoparticles;
an aprotic negative electrode including a second electrode potential that is more negative than the first electrode potential of the positive electrode;
at least one aprotic conductor ionically connecting the positive electrode to the aprotic negative electrode, the conductor transporting positive ions released by the aprotic negative electrode during a discharge cycle of the electrochemical energy storage device and absorbed by the aprotic negative electrode during a charge cycle; and
discharging of the electrochemical energy storage device produces a reduced form of the functionalized boron nitride nanoparticles, and charging of the electrochemical energy storage device produces an oxidized form of the corresponding functionalized boron nitride nanoparticles;
wherein the covalently functionalized boron nitride nanoparticles comprise being functionalized with at least one of:
alkyl groups selected from the group consisting of methyl (—$CH_3$), ethyl (—$CH_2$—$CH_3$), propyl (—$(CH_2)_2$—$CH_3$), butyl (—$(CH_2)_3$—$CH_3$), isopropyl ($CH(CH_3)_2$), isobutyl (—$CH_2$—$CH(CH_3)_2$), and tertiary butyl (—$C(CH_3)_3$),
at least one of phenyl (—$C_6H_5$) and substituted phenyl,
alkoxy groups selected from the group consisting of methoxy (—O—$CH_3$), ethoxy (—O—$CH_2$—$CH_3$), propoxy (—O—$(CH_2)_2$—$CH_3$), and butoxy (—O—$(CH_2)_3$—$CH_3$), amino (—$NH_2$) and N-functionalized amino groups,
hydroxyl (—OH), oxo (—O—), peroxo (—O=O—), sulfo (—S—), disulfo (—S—S—), nitrozo (—N=O), carbonyl (—C=O), cyano (—C≡N), isocyano (—N≡C), cyanato (—O—C≡N), fulminato (—C≡N→O), isocyanato (—N=C=O), thiocyanato (—S—C≡N), thiofulminato (—C≡N→S), isothiocyanato (—N=C=S), and dicyano (—N=C=C=N—),
ethynyl (—C≡C—) and diethynyl (—C≡C—C≡C—),
carbodiimido (—N=C=N—) and borodiimido (—N=B—N=↔=N—B=N—),
hydro (—H), nitrido (—N), and halogeno (—F, —Cl, —Br, —I),
Lewis bases including at least one of nitrogen derivatives and phosphor derivatives,
Lewis acids including at least one of boron derivatives and aluminum derivatives
transition metal complex anions including $M^{(I)}(CN)_6^{5-}$, $M^{(IIh)}(CN)_6^{4-}$, $M^{(IIIh)}(CN)_6^{3-}$, $M(CN)_4^{2-}$, and mixtures thereof, wherein $M^{(I)}$ is Mn, $M^{(IIh)}$ is selected from the group consisting of Cr, Mn, and Fe, $M^{(IIIh)}$ is selected from the group consisting of Ti, V, Cr, Mn, Fe, and Co, and M is selected from the group consisting of Ni, Cu, and Zn; and
wherein the nitrogen derivatives and phosphor derivatives include at least one of $NF_3$ and $PF_3$.

9. An electrochemical energy storage device comprising:
a positive electrode including a first electrode potential, the positive electrode comprising:
a positive electrode current collector;
a porous, electrically and ionically conducting matrix contacting the positive electrode current collector; and
covalently functionalized boron nitride nanoparticles embedded in the porous, electrically and ionically conducting matrix, both electrons and ions are conducted to the functionalized boron nitride nanoparticles;
an aprotic negative electrode including a second electrode potential that is more negative than the first electrode potential of the positive electrode;
at least one aprotic conductor ionically connecting the positive electrode to the aprotic negative electrode, the conductor transporting positive ions released by the aprotic negative electrode during a discharge cycle of the electrochemical energy storage device and absorbed by the aprotic negative electrode during a charge cycle; and
discharging of the electrochemical energy storage device produces a reduced form of the functionalized boron nitride nanoparticles, and charging of the electrochemical energy storage device produces an oxidized form of the corresponding functionalized boron nitride nanoparticles;
wherein the covalently functionalized boron nitride nanoparticles comprise being functionalized with at least one of:
alkyl groups selected from the group consisting of methyl (—$CH_3$), ethyl (—$CH_2$—$CH_3$), propyl (—$(CH_2)_2$—$CH_3$), butyl (—$(CH_2)_3$—$CH_3$), isopropyl ($CH(CH_3)_2$), isobutyl (—$CH_2$—$CH(CH_3)_2$), and tertiary butyl (—$C(CH_3)_3$),
at least one of phenyl (—$C_6H_5$) and substituted phenyl,
alkoxy groups selected from the group consisting of methoxy (—O—$CH_3$), ethoxy (—O—$CH_2$—$CH_3$), propoxy (—O—$(CH_2)_2$—$CH_3$), and butoxy (—O—$(CH_2)_3$—$CH_3$),
amino (—$NH_2$) and N-functionalized amino groups,
hydroxyl (—OH), oxo (—O—), peroxo (—O=O—), sulfo (—S—), disulfo (—S—S—), nitrozo (—N=O), carbonyl (—C=O), cyano (—C≡N), isocyano (—N≡C), cyanato (—O—C≡N), fulminato (—C≡N→O), isocyanato (—N=C=O), thiocyanato (—S—C≡N), thiofulminato (—C≡N→S), isothiocyanato (—N=C=S), and dicyano (—N=C=C=N—),
ethynyl (—C≡C—) and diethynyl (—C≡C—C≡C—),
carbodiimido (—N=C=N—) and borodiimido (—N=B—N=↔=N—B=N—),
hydro (—H), nitrido (—N), and halogeno (—F, —Cl, —Br, —I),
Lewis bases including at least one of nitrogen derivatives and phosphor derivatives,
Lewis acids including at least one of boron derivatives and aluminum derivatives
transition metal complex anions including $M^{(I)}(CN)_6^{5-}$, $M^{(IIh)}(CN)_6^{4-}$, $M^{(IIIh)}(CN)_6^{3-}$, $M(CN)_4^{2-}$, and mixtures thereof, wherein $M^{(I)}$ is Mn, $M^{(IIh)}$ is selected from the group consisting of Cr, Mn, and Fe, $M^{(IIIh)}$ is selected from the group consisting of Ti, V, Cr, Mn, Fe, and Co, and M is selected from the group consisting of Ni, Cu, and Zn; and wherein the boron derivatives include at least one of $BH_3$, $BLi_3$, $BNa_3$, $B(CH_3)_3$, $BF_3$, and $BR_1 R_2 R_3$, each of $R_1$, $R_2$, $R_3$ consisting of a halogen selected from the group consisting of F, Cl, Br and I.

10. An electrochemical energy storage device comprising:
a positive electrode including a first electrode potential, the positive electrode comprising:
a positive electrode current collector;
a porous, electrically and ionically conducting matrix contacting the positive electrode current collector; and
covalently functionalized boron nitride nanoparticles embedded in the porous, electrically and ionically conducting matrix, both electrons and ions are conducted to the functionalized boron nitride nanoparticles;
an aprotic negative electrode including a second electrode potential that is more negative than the first electrode potential of the positive electrode;
at least one aprotic conductor ionically connecting the positive electrode to the aprotic negative electrode, the conductor transporting positive ions released by the aprotic negative electrode during a discharge cycle of the electrochemical energy storage device and absorbed by the aprotic negative electrode during a charge cycle; and
discharging of the electrochemical energy storage device produces a reduced form of the functionalized boron nitride nanoparticles, and charging of the electrochemical energy storage device produces an oxidized form of the corresponding functionalized boron nitride nanoparticles;
wherein the covalently functionalized boron nitride nanoparticles comprise being functionalized with at least one of:
alkyl groups selected from the group consisting of methyl (—$CH_3$), ethyl (—$CH_2$—$CH_3$), propyl (—$(CH_2)_2$—$CH_3$), butyl (—$(CH_2)_3$—$CH_3$), isopropyl ($CH(CH_3)_2$), isobutyl (—$CH_2$—$CH(CH_3)_2$), and tertiary butyl (—$C(CH_3)_3$),
at least one of phenyl (—$C_6H_5$) and substituted phenyl,
alkoxy groups selected from the group consisting of methoxy (—O—$CH_3$), ethoxy (—O—$CH_2$—$CH_3$), propoxy (—O—$(CH_2)_2$—$CH_3$), and butoxy (—O—$(CH_2)_3$—$CH_3$),
amino (—$NH_2$) and N-functionalized amino groups,
hydroxyl (—OH), oxo (—O—), peroxo (—O—O—), sulfo (—S—), disulfo (—S—S—), nitrozo (—N=O), carbonyl (—C=O), cyano (—C≡N), isocyano (—N≡C), cyanato (—O—C≡N), fulminato (—C≡N→O), isocyanato (—N=C=O), thiocyanato (—S—C≡N), thiofulminato (—C≡N→S), isothiocyanato (—N=C=S), and dicvano (—N=C=C=N—),
ethynyl (—C≡C—) and diethynyl (—C≡C—C≡C—),
carbodiimido (—N=C=N—) and borodiimido (—N=B—N=↔=N—B=N—),
hydro (—H), nitrido (—N), and halogeno (—F, —Cl, —Br, —I),
Lewis bases including at least one of nitrogen derivatives and phosphor derivatives,
Lewis acids including at least one of boron derivatives and aluminum derivatives transition metal complex anions including $M^{(I)}(CN)_6^{5-}$, $M^{(IIh)}(CN)_6^{4-}$, $M^{(IIIh)}(CN)_6^{3-}$, $M(CN)_4^{2-}$, and mixtures thereof, wherein $M^{(I)}$ is Mn, $M^{(IIh)}$ is selected from the group consisting of Cr, Mn, and Fe, $M^{(IIIh)}$ is selected from the group consisting of Ti, V, Cr, Mn, Fe, and Co, and M is selected from the group consisting of Ni, Cu, and Zn; and
wherein the aluminum derivative is $AlF_3$.

11. The electrochemical energy storage device of claim/ the Lewis acids including at least one of boron derivatives and aluminum derivatives including $BH_3$, $BLi_3$, $BNa_3$, $B(CH_3)_3$, $BR_1 R_2 R_3$ and $AlR_1R_2R_3$ wherein each of $R_1$ $R_2$ and $R_3$ consists of a halogen selected from the group consisting of F, Cl, Br and I.

12. The electrochemical energy storage device of claim 1, the reaction product including at least one of —C≡N→$BF_3$, —C≡N→$BH_3$ and —C≡N→$BLi_3$ functional groups linked to the surface of the boron nitride nanoparticles.

* * * * *